United States Patent Office 2,847,697
Patented Aug. 19, 1958

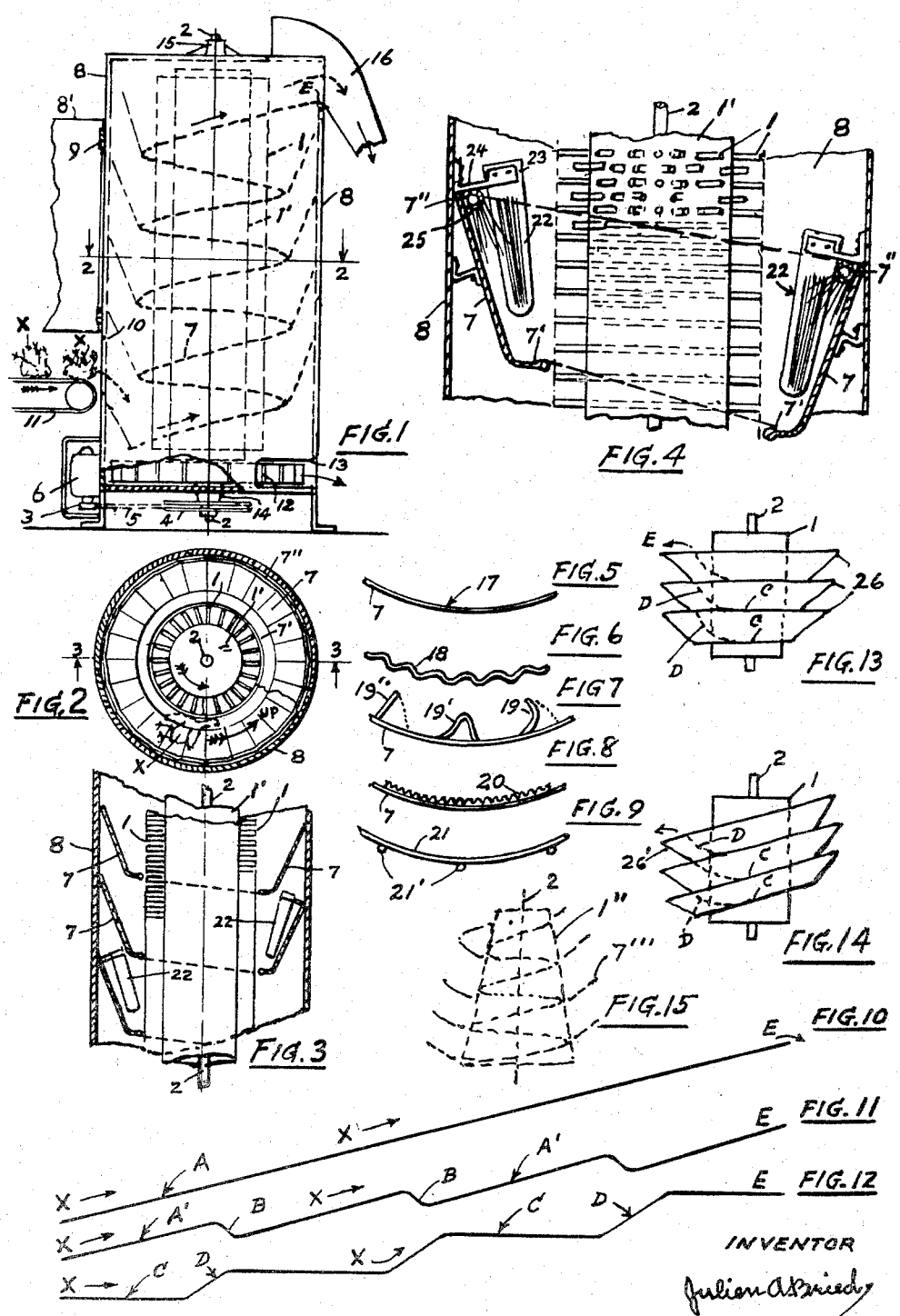

2,847,697
FOWL DEFEATHERING APPARATUS

Julien A. Bried, Berkeley, Calif., assignor to Honolulu Oil Corporation, a corporation of Delaware Application July 8, 1954, Serial No. 442,122

16 Claims. (Cl. 17—11.1)

This invention relates to improvements in the art of mechanically defeathering fowl, and has for its principal objects an improved method for accomplishing this, and special apparatus for carrying out the method.

Briefly described, the new method relates to that development of the fowl defeathering art wherein a loose fowl is rapidly tumbled about in every direction to open the wings and legs while striking or beating the fowl all over with dragging frictional blows until the feathers are all removed, and as first disclosed in Toti patent application No. 245,571 filed September 7, 1951, which was divided and issued as Patents 2,754,539 and 2,805,-443, but differs considerably therefrom, principally in the fact that the fowls are moved along a generally upwardly extending path to impose some of their weight against the beating force, and also to carry the fowl away from the released feathers. Also, so that the method may be continuous with the birds passing along in a generally upward stream while the feathers removed pass generally downward. Other features and advantages of the invention will appear in the following description and in the drawings accompanying this specification.

In the drawings:

Fig. 1 is a general side elevation of a novel apparatus devised to carry out my new method of defeathering fowl.

Fig. 2 is a cross section of the apparatus taken on the line 2—2 of Fig. 1 and showing the inner helical shell or guide along which the fowls pass upward urged by the rotor.

Fig. 3 is a vertical section of Fig. 2 taken along the line 3—3 thereof.

Fig. 4 is an enlarged sectional fragmentary portion of Fig. 3 showing more in detail one form of the fowl retarding baffles.

Figs. 5, 6, 7, 8 and 9 are enlarged plan fragmentary portions of the upper edge of the helical guide of Fig. 2 with various surface arrangements, baffles and retarding devices thereon.

Fig. 10 is a diagram showing the helical guide or path upwardly along which the fowls ascend, as stretched out to a straight uniformly ascending line, and as indicated by the helical dotted line 7 in Fig. 1.

Fig. 11 is a similar and comparative diagram to that of Fig. 10 but indicating the ascending path as dropping down at spaced intervals along its general ascent.

Fig. 12 is a third modification wherein the general ascent of travel of the fowl indicated by the line, is characterized by several level portions, each higher than the other joined by upwardly slanting steps or areas.

Fig. 13 is an elevation of a portion of the body of an apparatus as of Fig. 1, but with the circular guide or runway for the fowl arranged in conformity with the diagram of Fig. 12.

Fig. 14 is an elevation as per Fig. 13 but with the sections of the fowl guide or runway of that figure all tilted and with the slanted connecting steps positioned at the lower portions of the tilted successive portions of the runway.

Fig. 15 is a small sketch to show a modified form of the picking rotor and spiral guide or path about it for the fowls.

To give a quick understanding of the apparatus, it may be said that it comprises an upwardly extending central beating or picking rotor of what may be a cylindrical assemblage of conventional flexible fowl picking fingers, surrounded by a stationary substantially helical guide shell, or supporting runway for loose fowl to travel upwardly upon by the action of the rotating beaters or fingers. The helical shell or guide for the fowl is preferably a guide wall slanted downward and inward toward the rotor so that the fowls tend to fall toward the rotor to be struck thereby and thrown outward while being urged to travel upwardly along the guide from its lower or receiving end to discharge at its upper end, and thereby constantly rotating and turning the fowls rapidly about in every direction, and the speed being such as to spread the wings and legs of the fowls sufficiently so that the frictionally striking "picking fingers" of the rotor will reach every part of the fowl including under the wings and outer parts and between the legs as well, and the fowl will emerge completely picked, or may be run through two or more similar shorter apparatuses in succession automatically if preferred. A water spray is preferably kept playing on the fowl and/or guide to help wash and remove feathers downwardly in a down draft of air created by a large feather ejecting fan at the lower end of the apparatus so that the fowls in passing upwardly travel away from the released feathers to emerge substantially free from any loose adherent feathers.

Instead of the constantly ascending helical path or runway for the fowls, the runway may vary considerably while still generally ascending as indicated in Figs. 11, 12 and 14.

In further detail, Fig. 1, the upwardly extending cylindrical picking rotor is indicated at 1, its supporting shaft 2, driving pulleys 3, 4, belt 5, motor 6 here shown at the lower end of the apparatus though it is obvious the drive may be at the upper end if desired. The helical shell or fowl supporting runway or guide surrounding the rotor is designated 7 and is supported by and within any suitable outer frame, preferably a casing 8 which has one or more doors 8' hinged at 9 to open outwardly to make the interior of the apparatus accessible for cleaning or repairs.

A fowl receiving opening 10 is provided in the casing adjacent to the lower end of the helicoidal guide or path and into which the fowls may be fed by hand or as by a chute or a conveyor indicated at 11, and below this on the rotor shaft or drum is a centrifugal fan 12 sucking the released feathers downwardly and ejecting them outwardly through an opening 13 to any desired conduit or means of disposal.

The rotor shaft 2 is supported at 14 and 15 in suitable bearings, and at the upper end of the apparatus is a suitable discharge chute 16 for the picked fowl, and which may guide the fowl down into a similar apparatus for repetition of the treatment if desired, or to the degutting department in the usual fowl packing plant.

It is of course understood that the fowls before feeding into the picking apparatus have preferably been passed through warm or hot water as is the practice in the industry.

The picking rotor may be of any suitable construction known in the art, but is here indicated as a sheet metal hub or cylinder 1' secured to the shaft 2, and studded over the surface of the drum are relatively short flexible picking fingers 1 suitably secured thereto. These fingers are preferably of rubber roughened or ribbed exteriorly all as well-known in the art, and the helical runway or guide 7 for the fowl slants downwardly and inwardly toward the rotor, and with its inner edge preferably flanged and beaded as at 7' to just miss or clear the ends of the picking fingers.

The outer circumference 7" of the helical guide 7 may be round in plan or substantially so as the multi-sided shape shown in Fig. 2 to aid in tumbling the fowls over, or any less sided polygon, and its inner working surface may be of smooth metal or other material as indicated at 17 in Fig. 5, or corrugated as at 18 in Fig. 6, or provided with spaced baffles 19, 19', 19", of any desired size or shape as in Fig. 7 either flexible or rigid, metal, wood, or thick rubber, and/or the guide or runway 7 may be lined interiorly with rough or finely corrugated sheet rubber or other friction material as indicated at 20 in Fig. 8, and/or the helical guide may be entirely constructed of wire as shown in Fig. 9 with circumferentially extending wires 21 spaced about one-half inch to permit the passing of feathers, and these wires welded to upright supporting wires 21'.

Also, in order to aid in retarding the fowl from bodily advancing too quickly, any additional baffle means may be arranged to obstruct the too free bodily travel of the fowl, such as havy rubber flaps or bars 22 as indicated in Fig. 4 of any size preferably roughened or surface grooved or ribbed as indicated, and supported at their upper ends as at 23 from brackets 24 preferably in a manner to clear the surface of the helical guide 7 to let loose feathers pass downwardly while extending along the upper edge of the helical guide 7 is a perforated water spray pipe 25 arranged to spray water against the guide and fowls continuously or intermittently as may be desired, by any suitable controls as well known and not shown in the drawing.

As stated in the introductory description, the runway or path for the fowls need not be strictly helicoidal nor constantly ascending, as indicated in Fig. 10 by the line A, but may vary considerably as denoted by the diagrams Figs. 11 and 12 showing some examples of "generally" ascending paths as the general result is to raise the fowl X as it goes along in direction of the arrow.

In Fig. 13 several level circular sections 26 of the fowl guide or runway are shown as in superimposed arrangement and with each level portion C of the guide slanted upward at one point D in the circumference into the next level section C above to final discharge at "E," and as shown more clearly by the diagrammatic line in Fig. 12. Of course, there may be any number of such level sections 26 of the fowl runway or guide; also these superimposed sections 26 shown as level in Fig. 13 may all be tilted at an angle as shown at 26' in Fig. 14, and the slanted connection portions "D" of the runway "C" preferably are positioned at the lower desecending portions of the runway to gain the most use of the upward slanting portions as the fowls travel around the rotor. Another variation of the form of the "generally" ascending runway for the fowls is sufficiently shown in diagram Fig. 11 wherein (instead of the constant upward slant of the runway 7 indicated by line A of Fig. 10) there are successive upwardly slanted sections A' interrupted by downward steps B so that the momentum of the fowls' X upward movement will be broken by falling down these steps and result in a succession of lags in the general advance movement of the fowls until the rotor gets theme fully under way again. A similar retarding effect is produced by widely spaced baffles as shown at 19, 19', and 19" in Fig. 7, and also at 22 of Figs. 3 and 4. It is to be understood that any of the various baffles and/or linings and runway surface formations shown may be used or combined as desired in any of the runway modifications shown.

It is also evident from a glance at Fig. 14 that while the rotor is shown as vertical, it need not necessarily be so, as it may also be tilted. This also applies to the showing of Fig. 1 as the whole apparatus may be tilted if desired without unduly affecting its efficiency unless it be tilted considerably.

The apparatus may be made in sizes adapted to provide space for chickens only, or about twice as large to receive large turkeys, and in the latter case the apparatus will handle turkeys and chickens both passing through at the same time if desired.

For chickens the following apparatus dimensions have been found satisfactory, hub or drum diameter twenty-seven (27) inches, fingers projecting three and one-half inches, exterior diameter of runway or spiral guide about fifty inches, depth about fifteen inches, and about seven turns about the rotor, speed of rotor 240 R. P. M., the capacity of such an apparatus being as high as from 5 to 10 or more thousand chickens per hour completely picked.

It is of course evident that by reversing the direction of rotation of the rotor, the fowl may be fed into the top of the spiral or more properly helicoidal runway to emerge at the bottom, but the birds would travel through too fast for best efficiency and would emerge covered with loose feathers which would have to be rinsed off.

Also to be noted is, that while I show the rotor 1 as cylindrical, it need not be strictly so but may somewhat conical as indicated in Fig. 15 at 1" and the fowl guide or runway 7''' extending about it taking the same form. Hence the terms used in the claims are intended to include all such variations.

Having thus described my new method of mechanically defeathering fowl, and several variations of apparatus for carrying out the method, what I claim is:

I claim:

1. In a loose fowl defeathering apparatus, a rotor comprising a substantially cylindrical assemblage of outwardly projecting flexible spaced frictional defeathering beaters, means for rotating the rotor with its axis extending upwardly, means forming a substantially helicoidal fowl supporting path extending along and around said assemblage arranged to urge loose fowls into striking contact with said beaters for tumbling the fowl about and moving them upwardly along said path.

2. In an apparatus as set out in claim 1, conveyor means for automatically introducing loose fowl in substantially single file into the lower end of said path.

3. In an apparatus as set out in claim 1, spaced baffle means projecting into said path to impede free progress of the fowls therealong.

4. In an apparatus as set out in claim 1, spaced resilient frictional baffles projecting into said path to impede free progress of the fowls and curved in a manner to aid in turning the fowl over bodily.

5. In an apparatus as set out in claim 1, said fowl supporting path including a substantially helical wall extending about the rotor inwardly slanted downwardly toward the rotor and formed with a laterally extending flange at its inner edge.

6. In an apparatus as set out in claim 1, said fowl supporting path including a substantially helical wall extending about the rotor inwardly slanted downwardly toward the rotor and formed with a laterally extending flange at its inner edge rounded downwardly adjacent the beaters.

7. In a structure as set out in claim 1, said fowl supporting path including means at points therealong interrupting the angle of ascent of said path about said rotor.

8. In a structure as set out in claim 1, said fowl supporting path including downwardly offset steps at spaced points therealong permitting the fowl to fall and start upward again.

9. In a structure as set out in claim 1, said fowl supporting path including substantially level areas continued by slanted areas.

10. In a structure as set out in claim 1, said fowl supporting path including upwardly slanted areas continued by downwardly slanted areas.

11. An apparatus for defeathering loose fowls comprising means forming a substantially helicoidal path arranged and adapted for supporting and guiding loose fowls in tandem arrangement along and around an upwardly extending axis, means comprising a rotary assemblage of spaced flexible fowl defeathering beaters arranged to deliver rapid dragging frictional blows to the loose fowl on said path in a manner to tumble the loose fowl about in every direction while bodily urging them along said path, and means for rotating said assemblage.

12. In an apparatus as set out in claim 11, said path provided with openings of a size to pass released feathers while retaining the fowls.

13. An apparatus for defeathering loose fowls comprising means forming a defined path extending generally upwardly around and along upwardly extending axis arranged and adapted for supporting and guiding loose fowls in tandem arrangement therealong, means comprising a rotary assemblage of spaced flexible fowl defeathering beaters arranged to deliver rapid dragging frictional blows to the loose fowl on said path in a manner to tumble the loose fowl about in every direction while bodily forcing them upwardly along said path when the assemblage is rotating, means for so rotating said assemblage, and means providing for passing of the loosened feathers generally downward.

14. In an apparatus as set out in claim 13, means creating a down draft of air in said path urging the loosened feathers downward.

15. In an apparatus as set out in claim 13, a centrifugal fan at the bottom of said assemblage urging the fallen feathers outwardly.

16. In an apparatus as set out in claim 13, means for flushing down the fowl guiding path and loosened feathers with water while said assemblage is rotating.

References Cited in the file of this patent

UNITED STATES PATENTS

| | | |
|---|---|---|
| 379,498 | Van Gelder | Mar. 13, 1888 |
| 665,201 | Fay et al. | Jan. 1, 1901 |
| 703,916 | Haley | July 1, 1902 |
| 920,566 | Griggs | May 4, 1909 |
| 1,030,203 | Paulsen | June 18, 1912 |
| 1,372,595 | Bouda | Mar. 22, 1921 |
| 1,952,619 | Benner et al. | Mar. 27, 1934 |
| 2,235,619 | McMahan et al. | Mar. 18, 1941 |
| 2,454,090 | Reading | Nov. 16, 1948 |
| 2,469,345 | Toti et al. | May 3, 1949 |
| 2,523,302 | Hunt | Sept. 26, 1950 |
| 2,596,443 | Sharp | May 13, 1952 |
| 2,603,831 | Sharp | July 22, 1952 |
| 2,635,284 | Hunt | Apr. 21, 1953 |
| 2,691,786 | Reading | Oct. 19, 1954 |
| 2,754,539 | Toti | July 17, 1956 |